Patented Sept. 19, 1950

2,523,218

UNITED STATES PATENT OFFICE 2,523,218

INSECTICIDE COMPOSITION COMPRISING HEXAETHYL TETRAPHOSPHATE AND DI-(4-CHLOROPHENOXY)-METHANE

Eugene E. Kenaga, Midland, Mich., assignor to The Dow Chemical Company, Midland, Mich., a corporation of Delaware No Drawing. Application October 2, 1947, Serial No. 777,590

4 Claims. (Cl. 167—30)

This invention relates to insecticides and is particularly concerned with a composition including as toxicants hexaethyl tetraphosphate and di-(4-chlorophenoxy)-methane.

Hexaethyl tetraphosphate (technical grade) is an oily amber liquid having a specific gravity of 1.29 at 27°/4° C. This compound is soluble in water, ethanol, and diethyl ether and substantially insoluble in kerosene and other petroleum fractions. It has recently come into rather wide usage as an agricultural insecticidal toxicant. In such application, the compound accomplishes a quick kill of adult mite and certain insect pests, but has been found to be relatively ineffective as an ovicide and to have little residual toxicity. The exact mechanics of the action of this product is not understood and the possibility exists that much of its effectiveness is attributable to related compounds produced in its manufacture and present in the technical material e. g. tetraethyl pyrophosphate.

According to the present invention, it has been discovered that the addition of di-(4-chlorophenoxy)-methane to an insecticidal composition containing hexaethyl tetraphosphate results in a product of significantly improved properties as regards ovicidal effectiveness, residual toxicity, and economy of operation. The toxicants appear to be mutually activating so that a greater than additive or synergistic result is obtained permitting utilization of reduced amounts of hexaethyl tetraphosphate and of di-(4-chlorophenoxy)-methane and an achievement of results superior to those obtainable with either material alone. This synergistic effect is particularly evident as regards the residual activity of the mixture. The mixture remains effective on treated surfaces for a much longer period than either toxic substituent, the exact period of effectiveness varying somewhat with the particular surface treated and with the climatic conditions to which deposits of the mixture are exposed.

Hexaethyl tetraphosphate and di-(4-chlorophenoxy)-methane appear to be at least partially miscible, and may be employed in any desirable proportions, one with the other, to obtain compositions falling within the scope of the present invention. A preferred embodiment of the invention comprises an aqueous dispersion adapted to be employed as an agricultural spray and containing from 0.25 to 2.0 parts by weight or more of hexaethyl tetraphosphate for each part by weight of di-(4-chlorophenoxy)-methane. For best results, such aqueous dispersion should contain at least 0.5 pound of di-(4-chlorophenoxy)-methane per 100 gallons, although this preferred minimum concentration may vary considerably depending upon the particular organism to be controlled. Because of the instability of hexaethyl tetraphosphate, the spray mixture should be applied as soon as possible following preparation and the use in such compositions of strongly alkaline wetting, dispersing and conditioning agents avoided.

The preparation of spray compositions as described above is readily accomplished by separately dispersing the toxicants, or mixtures of each toxicant with suitable wetting and dispersing agents or extenders, with the required amount of water. Application to growing plants is accomplished with conventional equipment and in such fashion as to accomplish the wetting of the infested or infected surfaces.

Wetting and dispersing agents which have been found suitable as additaments in the aqueous spray mixtures include dioctyl sodium sulfosuccinate, sodium lauryl sulfate, polyethyleneglycol phenyl isooctyl ether, and polyoxyalkylene derivatives of sorbitan monolaurate.

Where it is desired to employ the mixture of toxicants in dust compositions, the latter should be applied soon after preparation, and appreciably higher concentrations of both toxicants employed than have been indicated as operable in aqueous spray mixtures. Suitable finely divided carriers include volcanic ash, prophyllite, wood and bark flours, and the like.

Among the organisms which may be controlled by application of the combination of toxicant materials as described above are aphids, European red mite, citrus red mite, two-spotted spider mite, Mexican bean beetle, and southern army worm.

The following examples illustrate the invention but are not to be construed as limiting.

*Example 1*

An insecticidal composition was prepared in the form of a wettable powder by grinding together 40 parts by weight of di-(4-chlorophenoxy)-methane, 1 part of sodium lauryl sulfate, 2 parts of a commercial wetting agent identified as being a mixture of a mono-sodium alkyl sulfonate and an inorganic suspending agent, and 57 parts of an Attapulgite type clay. This product is hereinafter referred to as "Concentrate A." Similarly, a liquid concentrate was produced by stirring together 90 parts by weight of hexaethyl tetraphosphate (technical grade)

and 10 parts of dioctyl sodium sulfosuccinate, and is hereinafter referred to as "Concentrate B."

Concentrate A was dispersed in water in such amount as to obtain a spray composition containing 1 pound of di-(4-chlorophenoxy)-methane per 100 gallons. This spray was applied to mature cranberry bean plants infested with southern army worm. As a result of this application, a 0 percent mortality of the worms was obtained.

In an exactly comparable operation, concentrate B was dispersed in water to obtain a spray containing 0.5 pound of hexaethyl tetraphosphate per 100 gallons. This composition was applied to bean foliage as described above, and a 0 percent control of southern army worm was observed.

A further determination carried out concurrently with those described above employed both concentrate A and concentrate B in the same spray mixture. The amounts of the concentrates were so selected that 100 gallons of the ultimate spray mixture contained 1 part of di-(4-chlorophenoxy)-methane and 0.5 pound of hexaethyl tetraphosphate. This composition was applied for the control of southern army worms on mature cranberry bean plants and found to give a kill of 60 percent.

In each of the foregoing operations, the bean foliage was sprayed with the indicated compositions, the spray residue allowed to dry, and the plant then infested with a known number of insect larvae. All mortality counts were made 72 hours after infestation.

Example 2

Concentrates A and B, as described in Example 1, were employed in the preparation in a series of spray compositions for use in the control of two-spotted spider mite on bean plants. In these operations, the plants were sprayed, allowed to dry, and groups thereof infested with adult mites at varying intervals following spraying.

One group of the mature cranberry bean plants was sprayed with an aqueous composition comprising sufficient of concentrate A to give 1.0 pound of di-(4-chlorophenoxy)-methane per 100 gallons. A second group was sprayed with an aqueous dilution of concentrate B containing 0.5 pound of hexaethyl tetraphosphate per 100 gallons. The third group of plants was sprayed with a dispersion in water of both concentrates A and B, and contained 1.0 pound of di-(4-chlorophenoxy)-methane and 0.5 pound of hexaethyl tetraphosphate per 100 gallons.

Specimens from each group of plants were infested with two-spotted spider mite adults 24 hours after spraying. Two days after infestation, the plants were examined and counts made to determine mortalities. The spray containing the di-(4-chlorophenoxy)-methane alone gave a kill of 6 percent of the mites. The spray containing the hexaethyl tetraphosphate alone gave a kill of 2 percent of the mites. The spray containing both toxicants gave a kill of 100 percent.

A similar series of observations were carried out wherein specimens from each group of sprayed plants were infested with two-spotted spider mites 48 hours after spraying. Four days after infestation, the spray containing di-(4-chlorophenoxy)-methane alone had accomplished a kill of 10 percent, and that containing the tetraphosphate toxicant alone, a kill of 20 percent of the adult mites. Again, the spray containing the combination of toxicants gave a kill of 100 percent.

A further determination was made in which the sprayed plants were infested 72 hours after spraying and counts made three days after infestation. The spray containing di-(4-chlorophenoxy)-methane alone gave a kill of 0 percent and that containing the hexaethyl tetraphosphate alone gave a kill of 6 percent of the mites. The spray containing the combination of toxicants gave a kill of 92 percent of the organisms.

I claim:

1. An insecticide composition comprising as active toxicants (1) hexaethyl tetraphosphate and (2) di-(4-chlorophenoxy)-methane, and wherein the mixture of toxicants exerts a synergistic effect as regards insecticidal toxicity.

2. An agricultural insecticide composition in the form of an aqueous dispersion of (1) hexaethyl tetraphosphate and (2) di-(4-chlorophenoxy)-methane, and wherein the mixture of toxicants exerts a synergistic effect as regards insecticidal toxicity.

3. An insecticide composition comprising as active toxicants from 0.25 to 2.0 parts by weight of (1) hexaethyl tetraphosphate for each one part of (2) di-(4-chlorophenoxy)-methane, and wherein the mixture of toxicants exerts a synergistic effect as regards insecticidal toxicity.

4. An agricultural insecticide composition in the form of an aqueous dispersion of from 0.25 to 2 parts by weight of (1) hexaethyl tetraphosphate for each one part by weight of (2) di-(4-chlorophenoxy)-methane, and containing at least 0.5 pound of di-(4-chlorophenoxy)-methane per 100 gallons, and wherein the mixture of toxicants exerts a synergistic effect as regards insecticidal toxicity.

EUGENE E. KENAGA.

REFERENCES CITED

The following references are of record in the file of this patent:

UNITED STATES PATENTS

| Number | Name | Date |
|---|---|---|
| 2,143,639 | Caprio | Jan. 10, 1939 |
| 2,330,234 | Moyle | Sept. 28, 1943 |

OTHER REFERENCES

Hall, Report No. 252, Office of Publication Board, Department of Commerce, Washington, D. C., January 11, 1946, page 4.

Kilgore, Soap and Sanitary Chemicals, December 1945, pages 138, 139, 169, 171.

Martin, "Chemical and Insecticidal Properties of . . . Organic Phosphates," from Abstract, Mfg. Chemist, August 1947, page 345.